(12) United States Patent  
Yamaguchi (10) Patent No.: US 7,110,782 B2  
(45) Date of Patent: Sep. 19, 2006

(54) CELL SEARCH SYNCHRONIZATION (75) Inventor: Hirohisa Yamaguchi, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 433 days.

(21) Appl. No.: 10/283,539

(22) Filed: Oct. 30, 2002

(65) Prior Publication Data

US 2003/0119444 A1 Jun. 26, 2003

Related U.S. Application Data

(60) Provisional application No. 60/335,971, filed on Oct. 30, 2001.

(51) Int. Cl.
*H04B 15/00* (2006.01)

(52) U.S. Cl. ...... 455/502; 455/323; 455/324; 375/319; 375/365; 375/367; 375/145; 375/149; 370/324; 370/350; 370/503

(58) Field of Classification Search ......... 455/502, 455/323, 324; 375/319, 365, 367, 145, 149; 370/324, 350, 503

See application file for complete search history.

(56) References Cited

U.S. PATENT DOCUMENTS

| | | | | |
|---|---|---|---|---|
| 6,185,244 | B1 * | 2/2001 | Nystrom et al. | 375/145 |
| 6,574,205 | B1 * | 6/2003 | Sato | 370/335 |
| 6,728,297 | B1 * | 4/2004 | Rudolf | 375/145 |
| 2002/0064211 | A1 * | 5/2002 | Chen et al. | 375/149 |
| 2002/0181391 | A1 * | 12/2002 | Wang | 370/210 |
| 2004/0142712 | A1 * | 7/2004 | Rudolf | 455/502 |

\* cited by examiner

*Primary Examiner*—Nay Muang  
*Assistant Examiner*—Angelica M. Perez  
(74) *Attorney, Agent, or Firm*—Carlton H. Hoel; W. James Brady, III; Frederick J. Telecky, Jr.

(57) ABSTRACT

Cell search synchronization in spread spectrum communications systems using primary and second synchronization codes with symbol partitioning for shorter coherent combinations (despreading) which are combined non-coherently, and Fourier transform analysis automatically adjusts for phase rotation of the despread sub-symbols.

10 Claims, 12 Drawing Sheets

DESPREAD SUB-SYMBOLS $S_m^{(1)}, S_m^{(2)}, S_m^{(3)}, S_m^{(4)}$

FIRST COMBINATION OF $|S_m^{(1)} + S_m^{(2)}|$ AND $|S_m^{(3)} + S_m^{(4)}|$
SECOND COMBINATION OF $|S_m^{(1)} + S_m^{(4)}|$ AND $|S_m^{(2)} + S_m^{(3)}|$
THIRD COMBINATION OF $|S_m^{(1)} - S_m^{(3)}|$ AND $|S_m^{(2)} - S_m^{(4)}|$

SELECT THE LARGEST COMBINATION

ACCUMULATE SELECTED COMBINATION OVER SEQUENCE OF SYMBOLS

STORE AND INCREMENT INITIAL CHIP POSITION

DETERMINE SLOT SYNCHRONIZATION FROM LARGEST ACCUMULATION

CELL SEARCH SYNCHRONIZATION

CROSS-REFERENCE TO RELATED APPLICATIONS

This application claims priority from the following US provisional patent application: Ser. No. 60/335,971, filed Oct. 30, 2001.

BACKGROUND OF THE INVENTION

1. Field of the Invention

The invention relates to communications, and more particularly to spread spectrum digital communications and related systems and methods.

2. Background

Spread spectrum wireless communications utilize a radio frequency bandwidth greater than the minimum bandwidth required for the transmitted data rate, but many users may simultaneously occupy the bandwidth. Each of the users has a pseudo-random code for "spreading" information to encode it and for "despreading" (by correlation) the spread spectrum signal for recovery of the corresponding information. This multiple access is typically called code division multiple access (CDMA). The pseudo-random code may be an orthogonal (Walsh) code, a pseudo-noise (PN) code, a Gold code, or combinations (modulo-2 additions) of such codes. After despreading the received signal at the correct time instant, the user recovers the corresponding information while the remaining interfering signals appear noise-like. For example, the interim standard IS-95 for such CDMA communications employs channels of 1.25 MHz bandwidth and a code pulse interval (chip) Tc of 0.8138 microsecond with a transmitted symbol (bit) lasting 64 chips. The recent wideband CDMA (WCDMA) proposal employs a 3.84 MHz bandwidth with QPSK (quadrature phase-shift keying) modulation and chip duration of 0.26 microsecond. The CDMA code length applied to each information symbol may vary from 4 chips to 256 chips. The CDMA code for each user is typically produced as the modulo-2 addition of a Walsh code with a pseudo-random code (two pseudo-random codes for the real and imaginary parts of QPSK modulation) to improve the noise-like nature of the resulting signal. A cellular system could employ IS-95 or WCDMA for the air interface between the base station and the mobile users within a cell.

A spread spectrum receiver synchronizes with the transmitter by code acquisition followed by code tracking. Code acquisition includes an initial search to bring the phase of the receiver's local code generator to within typically a half chip of the transmitter's, and code tracking maintains fine alignment of chip boundaries of the incoming and locally generated codes. Code acquisition will also include a three-step cell search as described in more detail below. Conventional code tracking utilizes a delay-lock loop (DLL) or a tau-dither loop (TDL), both of which are based on the well-known early-late gate principle. Note that there are roughly 500 carrier cycles per chip.

In a multipath situation a RAKE receiver has individual demodulators (fingers) tracking separate paths and combines the results to improve signal-to-noise ratio (SNR), typically according to a method such as maximal ratio combining (MRC) in which the individual detected signals are synchronized and weighted according to their signal strengths. A RAKE receiver usually has a DLL or TDL code tracking loop for each finger together with control circuitry for assigning tracking units to received signal paths.

The 3GPP UMTS (universal mobile telecommunications system) approach UTRA (UMTS terrestrial radio access) provides a spread spectrum cellular air interface with both FDD (frequency division duplex) and TDD (time division duplex) modes of operation. UTRA currently employs radio frames with 10 ms duration and partitioned into 15 time slots (0.667 ms duration) with each time slot consisting of 2560 chips. In FDD mode the base station and the mobile user transmit on different frequencies, whereas in TDD mode a time slot may be allocated to transmissions by either the base station (downlink) or a mobile user (uplink). In addition, TDD systems are differentiated from the FDD systems by the presence of interference cancellation at the receiver. The spreading gain for TDD systems is small (8–16), and the absence of the long spreading code implies that the multi-user multipath interference does not look Gaussian and needs to be canceled at the receiver.

In currently proposed 3GPP in FDD mode, a mobile user performs an initial cell search when first turned on or entering a new cell. During the cell search the mobile user determines the downlink scrambling code and frame synchronization of the cell (base station). The 3GPP informative cell search procedure has the following three steps:

1. Slot synchronization. The mobile user first detects the primary synchronization code (PSC) on the downlink synchronization channel (SCH) to acquire slot synchronization to a cell. The SCH occupies the first 256 chips out of the 2560 chips of each slot. This may be done with a single matched filter that is matched to the PSC which is common to all cells and not scrambled. The slot timing of the cell can seen from peaks in the matched filter output; see FIG. 2a.

2. Frame synchronization and code-group identification. Next, the mobile user detects the sequence of secondary synchronization codes (SSCs) on the SCH to find frame synchronization an identify the code group of the cell found in step 1. This may be done by correlating the received (slot-synchronized) signal with all 64 defined SSC sequences of length 15 (one SSC per slot), and identifying the maximum correlation. There are 16 distinct SSCs, and the length-15 sequence of SSCs may include repeats of a particular SSC. The length-15 sequences are unique under cyclic shifts of less than 15, so the maximum correlation identifies both the particular length-15 sequence and the frame synchronization. The 64 length-15 sequences correspond to 64 scrambling code groups, so step 2 also determines the scrambling code group of the cell. Because there are 64 length-15 sequences and 15 possible shifts of each sequence, there are 64×15=960 correlations over a 15-slot interval to compare.

3. Scrambling-code identification. Lastly, the mobile user determines the primary scrambling code used by the found cell (base station) in steps 1–2 through symbol-by-symbol correlation of the received signal over the common pilot channel (CPICH) with all 8 scrambling codes within the scrambling code group identified in step 2. After the primary scrambling code has been identified, the mobile user detects the primary common control physical channel (P-CCPCH) and reads system-specific and cell-specific broadcast channel (BCH) information.

Analogously, a TDD mode cell search also has three steps, but the channel structure differs in that the physical synchronization channel (PSCH) has 256 chips in just one or two time slots per frame and with a selected offset from the beginning of the slot. As with FDD, the TDD base station transmits the PSC and SSCs in the PSCH without scrambling. However, the TDD base station transmits a sum of the PSC and a scaled linear combination of three SSCs of a code set; the linear combination varies with periodicity of one or two frames and thereby allows determination of the code set. The cell search steps are.

1. Slot synchronization. The mobile user achieves slot synchronization to the strongest cell using the PSC. Furthermore, frame synchronization with the uncertainty of 1 out of 2 is obtained in this step. A single matched filter which is matched to the PSC may be used.

2. Frame synchronization and code-group identification. The mobile user next uses the linear combination of SSCs to find frame synchronization and identify one out of 32 code groups. Each code group is linked to a specific offest and thus to a specific frame timing, and each code group associates with four scrambling codes. Each scrambling code associates with a specific short and long basic midamble code. Also, for the cases of PSCH in two slots per frame, the mobile user performs more PSC correlation to find the position of the next PSCH slots (7 or 8 slot durations).

3. Scrambling code identification. Lastly, the mobile user determines the exact basic midamble code and the accompanying scrambling code used by the found cell. These are identified through correlation over the primary common control physical channel with all four midambles of the code group identified in step 2.

However, these synchronization methods have problems including low performance in the presence of frequency errors between the base station oscillator and the mobile user oscillator.

SUMMARY OF THE INVENTION

The present invention provides cell search synchronization including Fourier transform of despread sub-symbols to compensate for phase rotation.

This has advantages including increased tolerance to frequency errors.

DETAILED DESCRIPTION OF THE PREFERRED EMBODIMENTS

1. Overview

Preferred embodiment synchronization methods for 3GPP-type FDD and TDD modes uses a partitioning of the primary synchronization code (PSC) symbols and/or partitioning of the secondary synchronization codes (SSCs) symbols into sub-symbols and coherent detection within sub-symbols but incoherent combination of detected sub-symbols. Four sub-symbols (64 chips each) per symbol provides a good tradeoff. And discrete Fourier transform analysis compensates for phase rotation; this may be implemented by maximizing the transform magnitude.

Preferred embodiment spread spectrum communication systems incorporate preferred embodiment synchronization methods.

In preferred embodiment communications systems the base stations and the mobile users could each include one or more digital signal processors (DSP's) and/or other programmable devices with stored programs for performance of the signal processing of the preferred embodiment synchronization methods. The base stations and mobile users may also contain analog integrated circuits for amplification of inputs to or outputs from antennas and conversion between analog and digital; and these analog and processor circuits may be integrated on a single die. The stored programs may, for example, be in ROM onboard the processor or in external flash EEPROM. The antennas may be parts of RAKE detectors with multiple fingers for multipath signals. The DSP core could be a TMS320C6xxx or TMS320C5xxx from Texas Instruments.

2. First Step Synchronization

First preferred embodiment methods of initial cell search by mobile users of an UTRA system in FDD mode use the three step cell search with a mixture of coherent and non-coherent symbol detection. For the first step (slot synchronization) the mobile user detects in the SCH a sequence of repeats of the QPSK symbol, 1+j, without scrambling and spread with the common primary synchronization code (PSC). The SCH is the first 256 chips in each 2560 chip slot, so the spread symbol has duration 0.067 ms and repeat period (slot duration) of 0.667 ms. The detection is by a filter matched to the PSC. The 256-chip PSC has the form <a, a, a, −a, −a, a, a, −a, a, a, a, −a, a, −a, a, a> with a=<1, 1, 1, 1, 1, 1, −1, −1, 1, −1, 1, −1, 1, −1, −1, 1>.

First consider the case when the mobile user is exactly frequency synchronized with base station; that is, the local clock of the mobile user receiver is exactly synchronized with the clock of the base station transmitter. The sequence of the despread symbols from the matched filter have no relative phase error and the despread symbols add coherently. That is, let $S_m+N_m$ be the signal and noise components (complex numbers) of the mth despread symbol. (Each $S_m$ equals $\alpha(1+j)$ where $\alpha$ is a complex number reflecting the attenuation and phase-shift of the transmission channel; $\alpha$ is estimated periodically and factored out.) Then with exact synchronization for a sequence of 10 symbols:

$$\left|\sum_{1\le m\le 10}(S_m+N_m)\right|^2 = \left|\sum S_m\right|^2 + \left|\sum N_m\right|^2$$

$$= \left|\sum S_m\right|^2 + \left|\sum N_m\right|^2$$

where the cross terms $\Sigma S_m \Sigma N_n^*$ and $\Sigma N_m N_n^*$ essentially vanish due to the randomness of the noise.

Thus summing 10 successive symbols yields an increase by a factor of 100 in the power of the $S_m$ but the sum of 10 noise components only increases by a factor of 10 due to the random nature of the noise. Hence, signal-to-noise ratio (SNR) increases by summing over successive detected despread symbols.

However, if the mobile user clock is not exactly synchronized with the base station transmitter clock, then each successively received despread symbol is phase rotated from the preceding despread symbol. Thus the coherent sum may provide little SNR gain if the phase rotation causes destructive interference. In such a case the non-coherent sum provides a larger gain:

$$\Sigma_{1 \leq m \leq 10}|S_m+N_m|^2 = \Sigma|S_m|^2 + \Sigma|N_m|^2$$

Figure 3:
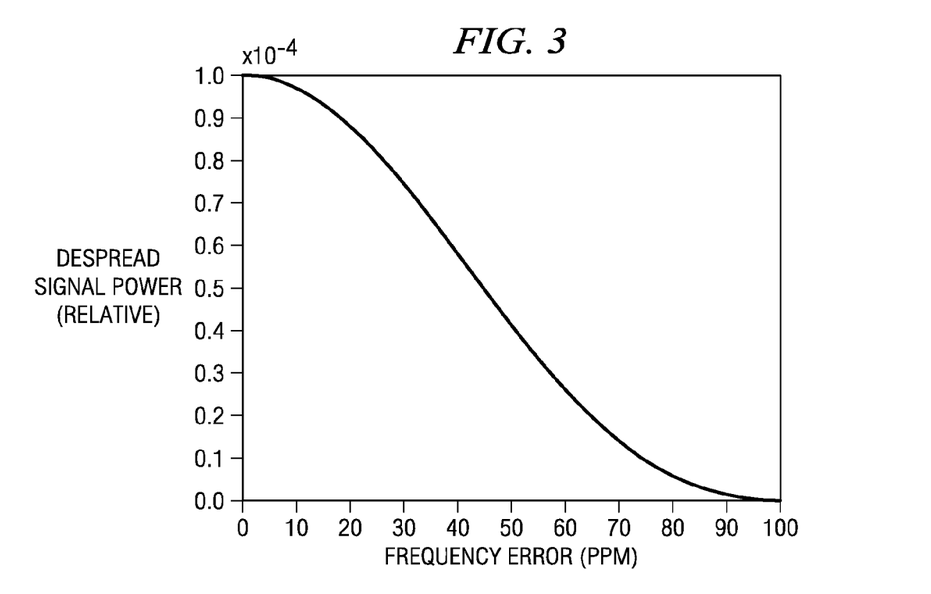
FIG. 3 shows despread signal power decreasing with frequency error.

Roughly, the coherent sum provides better SNR gain than the non-coherent sum if the clock synchronization is within 0.5 part per million (0.5 ppm). That is, for 3GPP with a transmission center frequency of roughly 2 GHz, the clocks must agree to within 1 KHz. FIG. 3 shows the theoretical decrease of the despread symbol power when the frequency error increases. In effect, the received signal is being mixed down at a frequency differing slightly from the carrier frequency, and this gives the phase rotation in the sense that the detected phase rather that taking on discrete offset values (0 and $\pi$ for each of in-phase and quadrature) drifts from these discrete values.

Figure 2A:
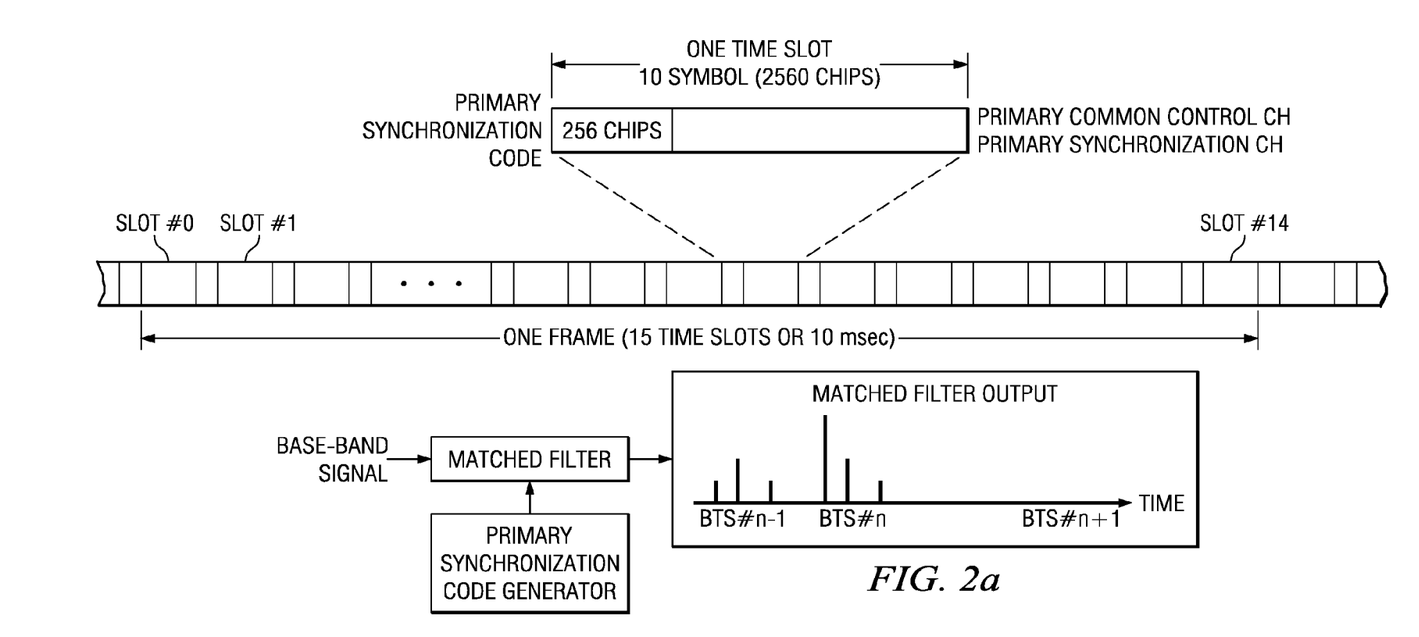
FIGS. 2a–2b illustrate synchronization steps.
Figure 2B:
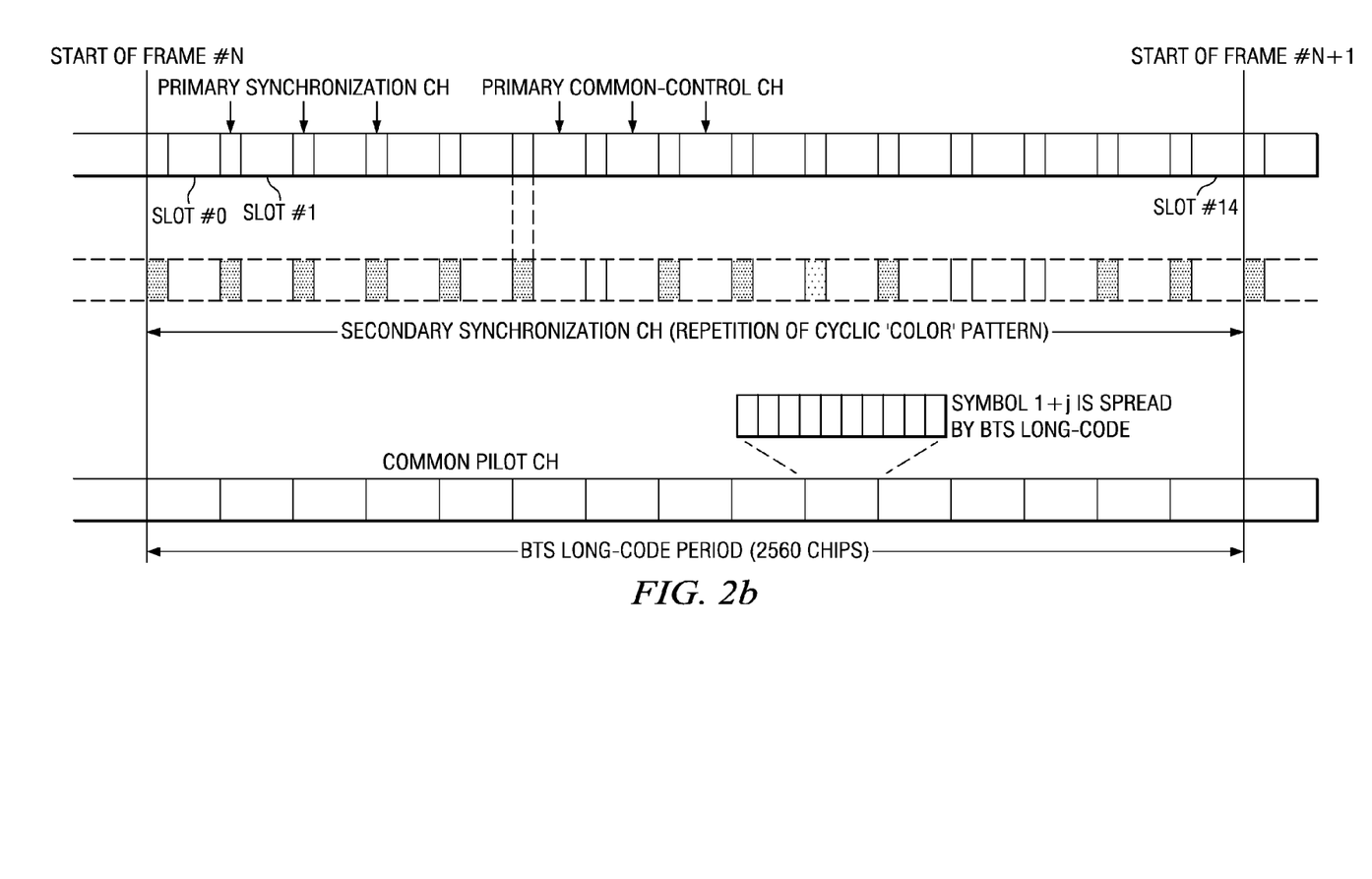
Figure 4:
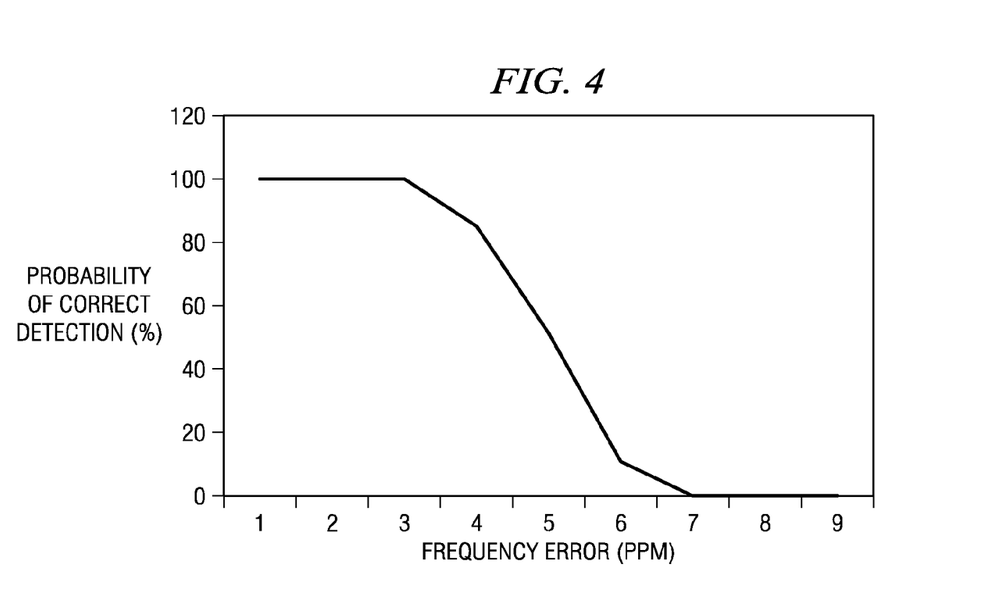
FIGS. 4, 6 show matched filter performance.

As illustrated in FIG. 2, the PSCs are located at intermittent positions within a frame (first 256 chips in each slot of 2560 chips), thus the phase rotation between the codes often becomes very large. The conventional approach to SNR gain was to increase the number of despread symbols in the foregoing non-coherent sum. However, due to the coherent nature of the despreading, there is an unavoidable limit in this approach. FIG. 4 shows the performance of the matched filter to detect the correct code position when 40 symbols are used for the non-coherent sum under constant white noise power conditions (despread symbol power to the noise spectrum density of 0 dB). Performance improvement is marginal even if a further larger number of symbols are summed. This shows that in order to realize a high-performance initial synchronization, an expensive local crystal oscillator (TCXO) of less than 3 ppm accuracy needs to be used. In practice, low-cost oscillators of 8 ppm or worse is desirable and higher tolerance against the frequency drift is also required due to a wide-range of temperature variations and power supply voltage drift.

The first step synchronization preferred embodiment methods attack two problems: (1) decrease of the signal power in successive despread symbols due to phase rotation, and (2) non-coherent summation of the signal power over the intermittent symbol positions of SCH in the physical channel.

In particular, the preferred embodiment methods avoid non-coherent summation by retaining in memory each despread symbol, that is, both in-phase (I) and quadrature (Q) components, for subsequent processing. Conventional matched filters save only the power (non-coherent) value for each despread symbol, and thus the preferred embodiment methods require double the local memory. This increased cost (memory size) is offset by the improved final result of the preferred embodiment methods.

Figure 5:
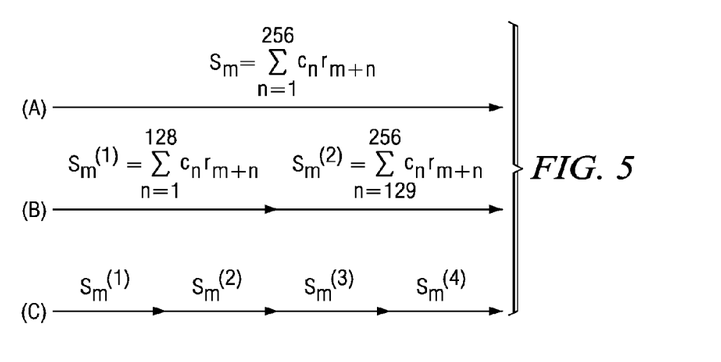
FIGS. 5, 7 illustrate sub-symbols.

Further, because the full-symbol despreading results in insufficient signal power when there is large phase rotation within the duration of the symbol (e.g., 256 chips), the preferred embodiment methods divide the symbol duration into a number of sub-symbols; FIG. 5 shows division into four sub-symbols. Thus when the received I+jQ signal is multiplied with the despreading code over 256 chips, the conventional full-symbol despreading is performed according to $$S_m = \Sigma_{1 \leq k \leq 256} c_k r_{m+k}$$

where $c_k$ and $r_k$ represent the chips of the despreading code (i.e., $\pm(1+j)$) and the received baseband complex signal, respectively. $S_m$ is thus the despread symbol. The subscript m denotes the offset chip position with respect to the correct despreading position, which is to be detected at the position where the largest matched filter output results. In the cell search first step synchronization the despreading code length is 256 chips, so the summation is over the range $1 \leq k \leq 256$. But in the preferred embodiment method sub-symbol despreading summation is divided into two or four sub-symbols as shown in FIGS. 5b–5c. Because the division into two sub-symbols can be generated by adding the division into four sub-symbols pairwise, consider the division into four sub-symbols. First note that a full $2\pi$ phase rotation over one symbol period (=256 chips=0.067 ms) corresponds to a 15 KHz (=3.84 MHz/256) frequency error in the mobile user's clock, which is 7.5 ppm of the 2 GHz carrier. Thus frequency error in the range of 0 to 8 ppm will be handled by the preferred embodiment methods. Note that division into more than four sub-symbols results in a lower SNR in each sub-symbol output and hence in an overall performance degradation.

Figure 6:
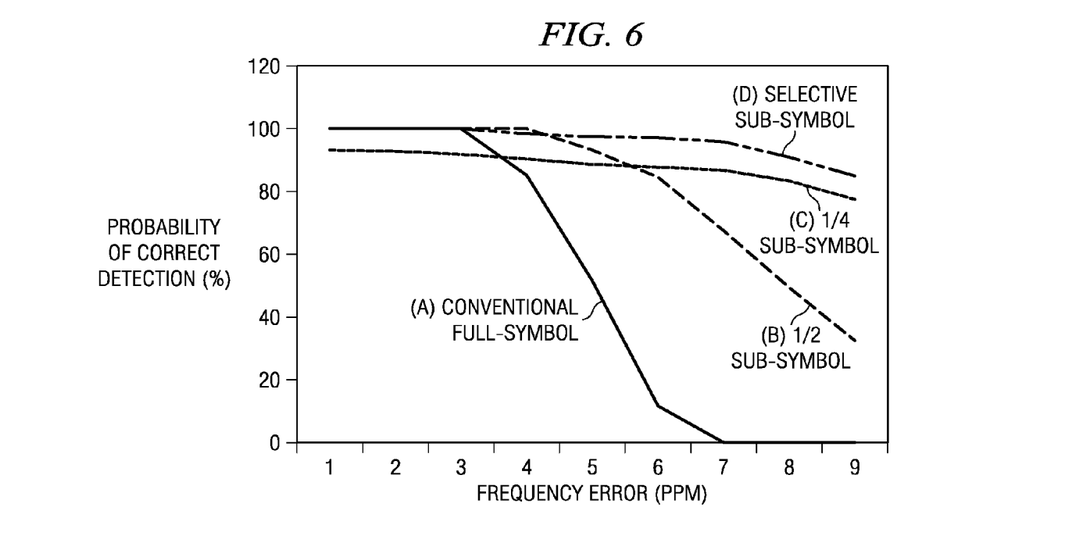

FIG. 6 compares the performance of the first step matched filter for the three cases of (a) the full-symbol despreading, (b) two sub-symbol despreading with non-coherent summation, and (c) four sub-symbols despreading with non-coherent summation. In each case the matched filter output was averaged over 30 symbols for the SNR measure.

The results of FIG. 6 show that two sub-symbols improves over the full-symbol up to 6 ppm frequency error, and four sub-symbols has fair performance up to 9 ppm frequency error. But for lower frequency error levels the four sub-symbols has worse performance than the full-symbol and two sub-symbols cases due to the lower SNR as the number of chips in the summation decreases. Thus an adaptive selection of either two sub-symbols or four sub-symbols would yield the best performance.

Figure 7:
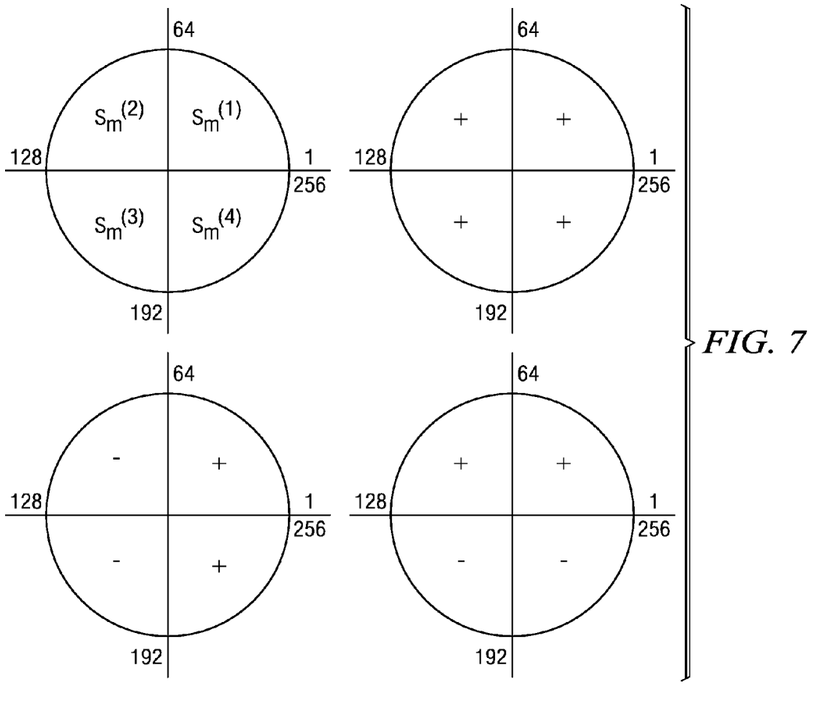

Consequently, the preferred embodiment methods divide a symbol (and the PSC code) into four sub-symbols for the matched filtering as illustrated on the unit circle in FIG. 7a; each sub-symbol has 64 chips duration and the matched filter correlates with each separately. When there is no frequency error (no phase rotation), FIG. 7b shows the sub-symbol phase relationships. With roughly $2\pi$ phase rotation, FIG. 7c shows the two possible approximate sub-symbol phase relationships. From these relationships, the maximum non-coherent power for a phase rotation in the range 0 to $2\pi$ can be estimated by the largest of the following three values:

$$P = |S_m^{(1)} + S_m^{(2)}|^2 + |S_m^{(3)} + S_m^{(4)}|^2$$

$$Q = |S_m^{(4)} + S_m^{(1)}|^2 + |S_m^{(2)} + S_m^{(3)}|^2$$

$$R = |S_m^{(1)} - S_m^{(3)}|^2 + |S_m^{(2)} - S_m^{(4)}|^2$$

P and Q are defined to be effective for both 0 and $2\pi$ phase rotations, while R is effective for the $2\pi$ phase rotation only. FIG. 6d shows the performance of the selective (i.e., using the largest of P,Q,R) non-coherent sub-symbol despreading. Note that selective non-coherent sub-symbol despreading performance is close to the full-symbol and two sub-symbol non-coherent despreadings for the smaller frequency errors and is close to the four sub-symbol non-coherent despreading for the larger frequency errors. Thus selective non-coherent sub-symbol despreading has better performance than either of these alternatives over the range 0 to 8 ppm frequency errors. As shown in FIG. 6 for the case of $E_S/N_0=1$ (0 dB), the preferred embodiment matched filter with four sub-symbols can achieve the probability of correct detection of over 90% for frequency errors in the range of 0 to 8 ppm where 30 PSC symbols are averaged over 30 ms. Also, a simplified preferred embodiment omits R with only up to a 5% loss of performance.

Figure 8:
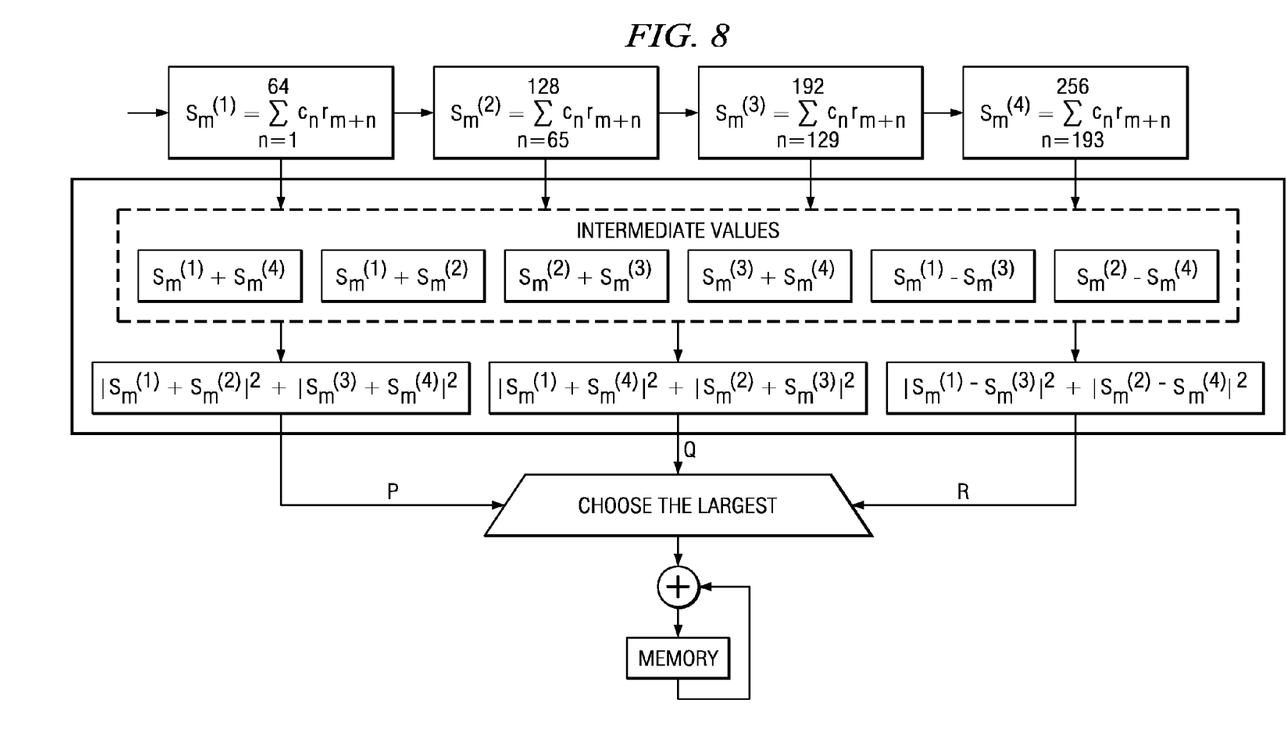
FIGS. 8, 10 show a preferred embodiment matched filter.
Figure 9A:
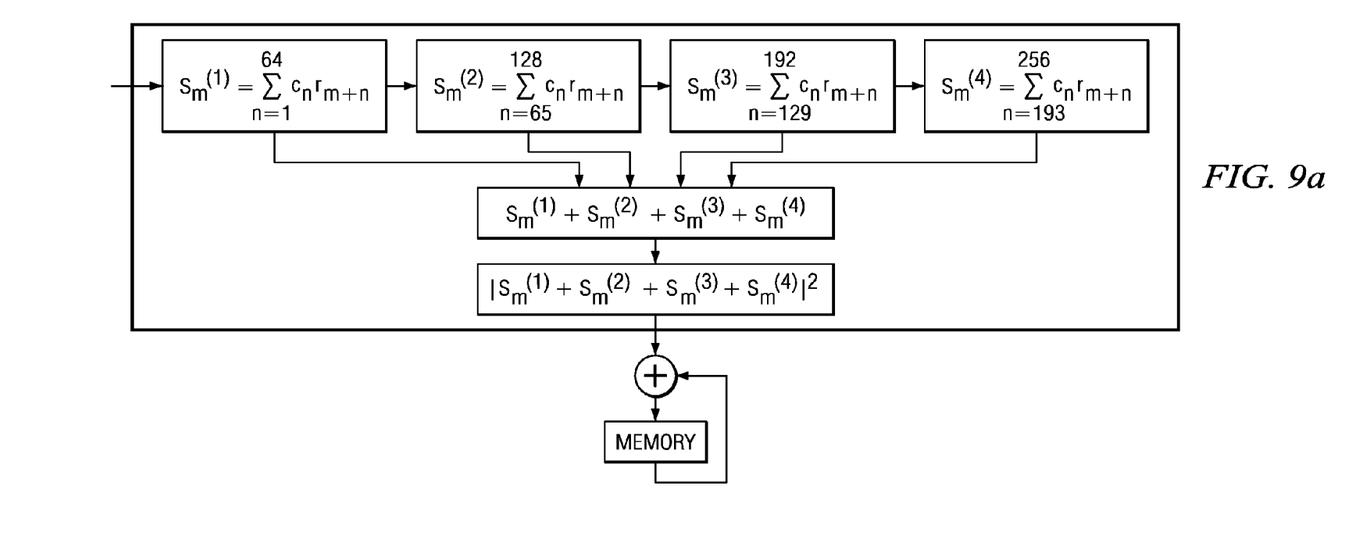
FIGS. 9a–9b show a matched filter.
Figure 9B:
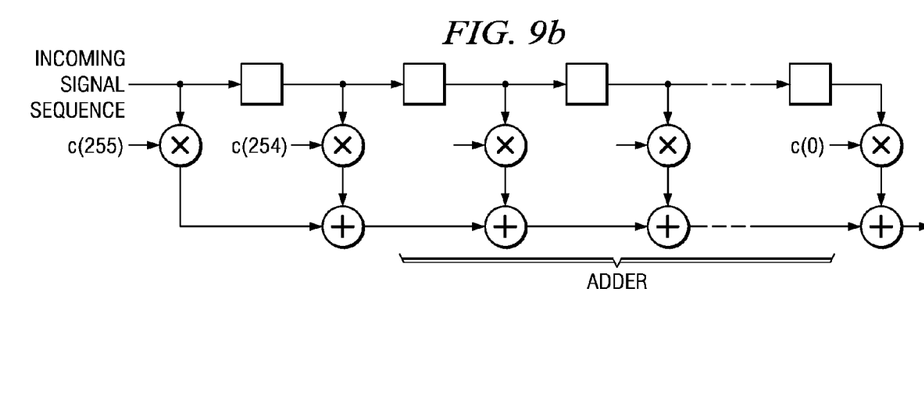
Figure 10:
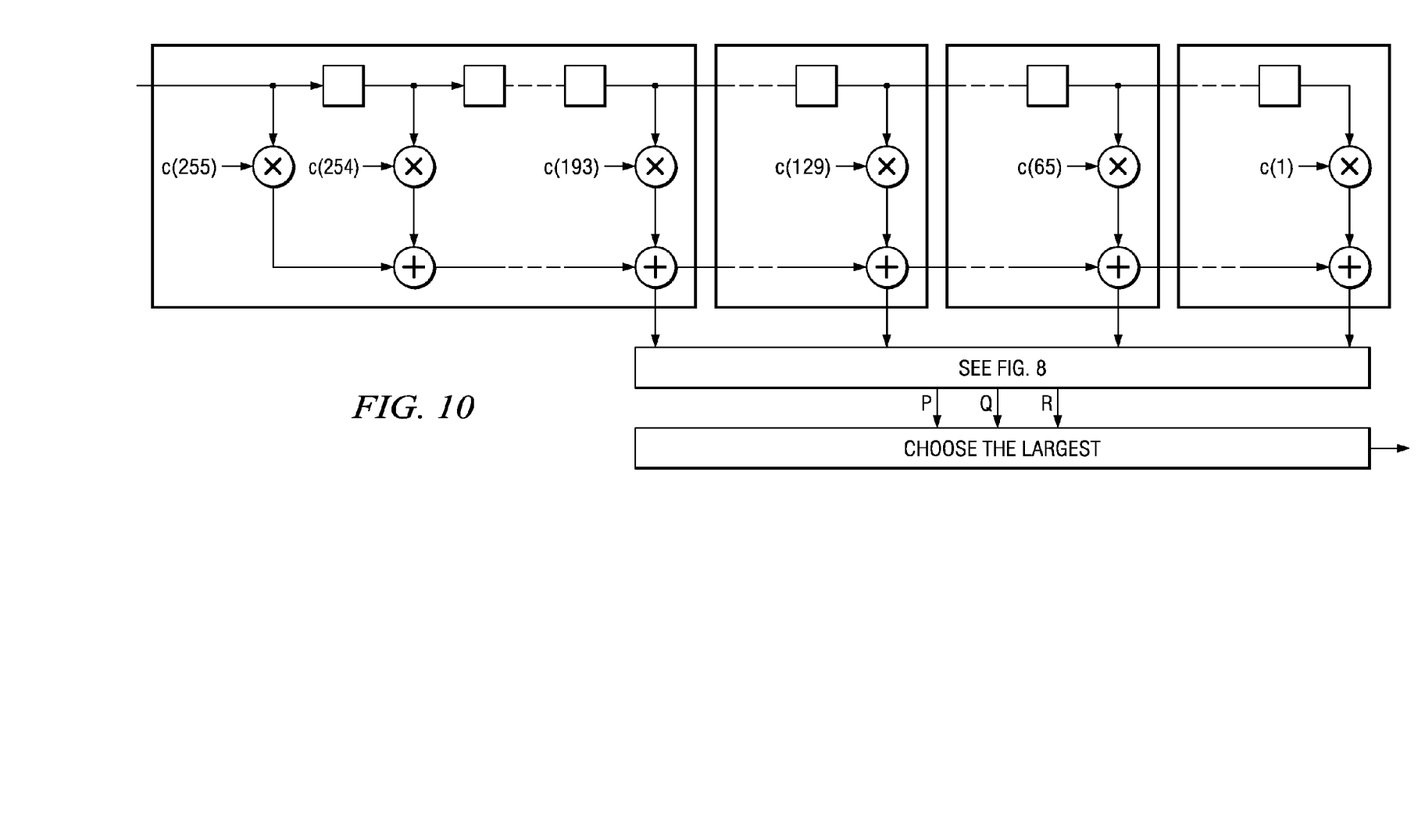

FIG. 8 illustrates a preferred embodiment matched filter which includes the P, Q, R computations. A conventional matched filter partitioned to show sub-symbols appears in FIG. 9a. A matched filter may be designed as a cascaded adder as shown in FIG. 9b, and hence the preferred embodiment hardware takes the form as in FIG. 10. Also, a replacement of the square operation with absolute value operation simplifies the matched filter hardware will small loss of performance.

Figure 1A:
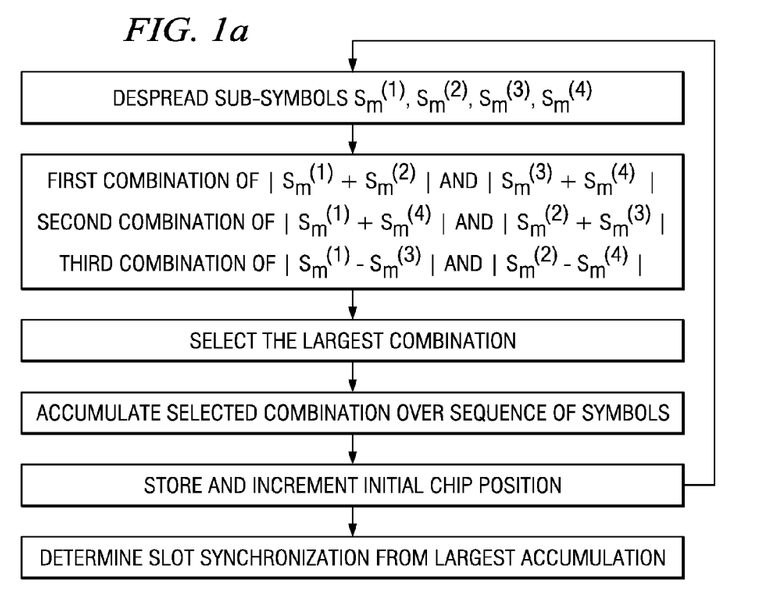
FIGS. 1a–1b are flow diagrams of preferred embodiment methods.

FIG. 1a is a flow diagram of a preferred embodiment method for the first step synchronization which uses three pairs of despread sub-symbols such as used in the P, Q, and R constructs.

3. Second Step Synchronization

After the cell search first step the receiver is slot synchronized, and the second step determines frame synchronization (frame boundary among 15 slots) plus the scrambling code group of the base station (which of the 64 possible scrambling code groups). That is, there are 960 (=15×64) possible combinations to correlate during the second step.

The second step synchronization correlates all 64 defined length-15 sequences of the SSCs with the (slot-synchronized) received signals in the SCH. The SSCs lie in the first 256 chips in each slot of the SCH just like the PSC, and the sequence of SSCs is colored cyclically over the 15 slots in a frame; see FIG. 2b illustrating timing and codes in all three steps. The coloring order represents the scrambling code group of the base station's scrambling code. The coloring is unique under shifts of less than 15, and thus determines both the scrambling code group and the frame synchronization. The 16 SSCs are generated from the 256-chip (1+j) <b, b, b, −b, b, b, −b, −b, b, −b, b, −b, −b, −b, −b, −b> where b=<1, 1, 1, 1, 1, 1, −1, −1, −1, 1, −1, 1, −1, 1, 1, −1> by position-wise multiplication by one of 16 Hadamard sequences of length 256.

The second step has been conventionally implemented by first defining D(group,shift) where the value of the variable "grp" designates one of the 64 scrambling code groups and the value of the variable "shft" designates one of the 15 possible cyclic shifts (0 to 14 slots) of the length-15 sequence of SSCs:

$$D(grp, shft) = \Sigma_{0 \le n \le 14} |\Sigma_{1 \le k \le 256} d_{n,k}(grp, shft) r_{n,k}|^2$$

where the sum over n is for 15 consecutive slots (a frame duration), $r_{n,k}$ is the kth chip of the received slot-synchronized spread symbol in the SCH of the nth slot, and dn,k(grp,shft) is the kth chip of the nth SSC in the length-15 sequence of SSCs associated with the scrambling code group "grp" and with the sequence shifted by "shft" slots. Thus the sum over k despreads the symbol of the nth slot with the SSC of the nth slot for scrambling code group grp after a shift by shft slots. Then the values of "grp" and "shft" that maximize D identify the scrambling code group and the frame boundary (shift) among the 15 consecutive slots labeled by n:

$$arg\{max_{1 \le grp \le 64, 0 \le shft \le 14} D(grp, shft)\}$$

The maximum is over the 960 combinations of 64 grp values and 16 shft values.

Figure 11:
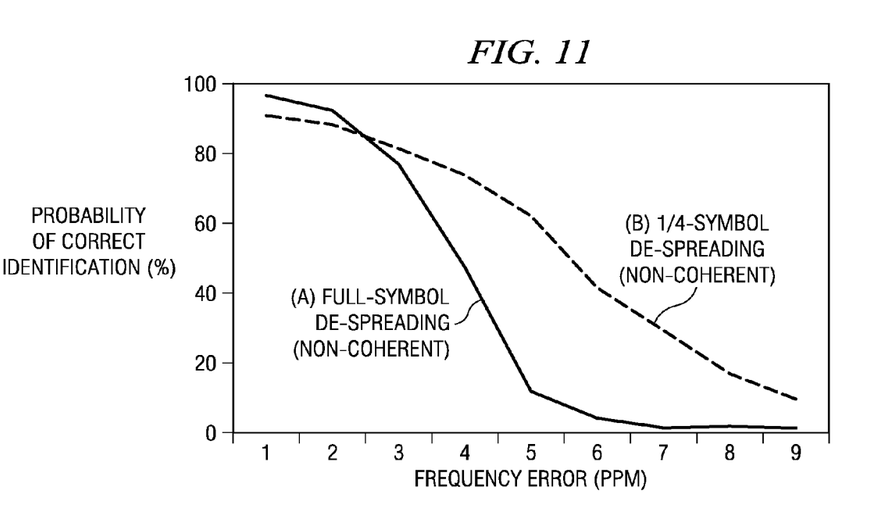
FIGS. 11, 13, 15 illustrate performance.

FIG. 11, curve (A) shows the performance of the conventional second step synchronization using 15 SSCs over one frame with a bit-energy-to-noise ratio $E_b/N_0=1$ (0 dB) for clock frequency error in the range 0 to 9 ppm. The conventional approach only works for frequency errors up to about 3 ppm, but this precludes cheap crystal oscillators.

The preferred embodiment second step synchronization methods improve performance by splitting the despreading into smaller segments analogous to the foregoing first step preferred embodiment methods. An example of the ¼ symbol non-coherent despreading redefines D as:

$$D(grp, shft) =$$

$$\sum_{0 \le n \le 14} \left\{ \left| \sum_{1 \le k \le 64} d_{n,k}(grp, shft) r_{n,k} \right|^2 + \left| \sum_{65 \le k \le 128} d_{n,k}(grp, shft) r_{n,k} \right|^2 \right.$$

$$+ |\Sigma_{129 \le k \le 192} d_{n,k}(grp, shft) r_{n,k}|^2$$

$$+ |\Sigma_{193 \le k \le 256} d_{n,k}(grp, shft) r_{n,k}|^2 \}$$

FIG. 11, curve (B) shows the performance of the preferred embodiment second step methods using ¼ symbols (four 64-chip despreadings) under the same conditions as the performance of the conventional method (256-chip despreading) shown in FIG. 11, curve (A). Due to the ¼ reduction in the number of signal samples in each sum, the signal-to-noise ratio drops by 6 dB in each 64-chip despreading and this appears as a performance degradation for frequency errors of less than 2 ppm. However, the preferred embodiment method improves performance for frequency errors of 5 ppm and more.

In more detail, consider the case of the correct length-15 sequence of SSCs being used for despreading. Then with a symbol split into 4 sub-symbols for despreading, the output of the correlation with the first 64 chips is $$S^{(1)} = \Sigma_{1 \le k \le 64} d_k(grp, shft) r_k$$

For simplicity, presume that there is no noise in the received signal, r. Then the second 64-chip sub-symbol despreading output is $$S^{(2)} = \sum_{65 \le k \le 128} d_k(grp, shft) r_k$$

$$= S^{(1)} e^{j64\lambda}$$

where λ represents the phase rotation due to the frequency error per one chip. Similarly for the third and fourth sub-symbols:

$$S^{(3)} = \sum_{129 \le k \le 192} d_k(grp, shft) r_k$$

$$= S^{(1)} e^{j128\lambda}$$

$$S^{(4)} = \sum_{193 \le k \le 256} d_k(grp, shft) r_k$$

$$= S^{(1)} e^{j192\lambda}$$

Thus the whole symbol coherent despreading output for the SSC in slot #0 (first slot) can be represented by $$D_0 = S^{(1)} + S^{(2)} + S^{(3)} + S^{(4)}$$
$$= S^{(1)}(1 + e^{j64\lambda} + e^{j128\lambda} + e^{j192\lambda})$$

and by rewriting $64\lambda$ as $\Lambda$, this simplifies to $$D_0 = S^{(1)}(1 + e^{j\Lambda} + e^{j2\Lambda} + e^{j3\Lambda})$$

Using this representation, the coherent despreading output ($D_n$) for the SSC in slot #n has the same form but with greater phase rotation due to greater distance from the presumptively synchronized slot #0.

$$D_n = S^{(1)}(e_{j40n\Lambda} + e_{j(40n+1)\Lambda} + e_{j(40n+2)\Lambda} + e^{j(40n+3)\Lambda})$$

The factor of 40 arises from the partitioning into 4 sub-symbols and the duration of 10 symbols (1 slot) between the first chips of successive SSCs in the SCH. Thus the coherent sum (D) of these results over the 15 SSCs (which is the smallest number of codes that constitute the whole color code sequence) becomes $$D = \sum_{0 \le n \le 14} D_n$$
$$= S^{(1)} \sum_{0 \le m \le 563} \kappa_m e^{jm\Lambda}$$
$$= \sum_{0 \le m \le 563} S_m$$

where $\kappa_m$ is 1 only for the positions corresponding to each term of the definitions of the $D_n$s and 0 for the others; that is, $\kappa_m$ is 1 for m=0, 1, 2, 3, 40, 41, 42, 43, 80, 81, . . . 560, 561, 562, 563, and $S_m$ is the corresponding despread sub-symbol (including phase rotation) using scrambling code group grp and code sequence shift shft. And for m=4, 5, . . . , 38, 39, 44, . . . , 558, 559, $S_m$=0.

The coherent sum defining D has its largest magnitude only when $\Lambda$=0. Thus finding the largest correlation to identify the scrambling code group and frame synchronization requires recognition of phase rotation. Hence, instead of simply adding each despread result, the preferred embodiment methods consider the following modified sum $$E(grp, shft, \phi) = \sum_{0 \le m \le 563} S_m e^{-jm\phi}$$

$S_m e^{-jm\phi}$ will approximate the despread sub-symbol (using grp,shft) in the case of no phase rotation when $\phi$ approximates the sub-symbol phase rotation $\Lambda$, and $E(grp, shft, \Lambda)$ will be the relevant correlation. When grp, shft are the correct code group and shift, $E(grp, shft, \Lambda)$ will be a maximum as a function of frequency $\phi$. Thus the preferred embodiment methods will identify the scrambling code group and frame synchronization from analysis of $E(grp, shft, \Lambda)$.

Figure 1B:
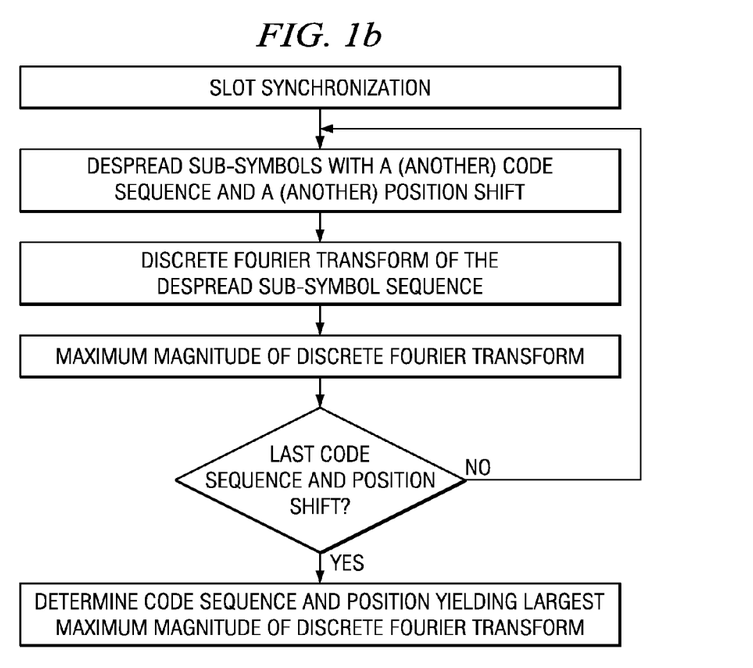
Figure 12:
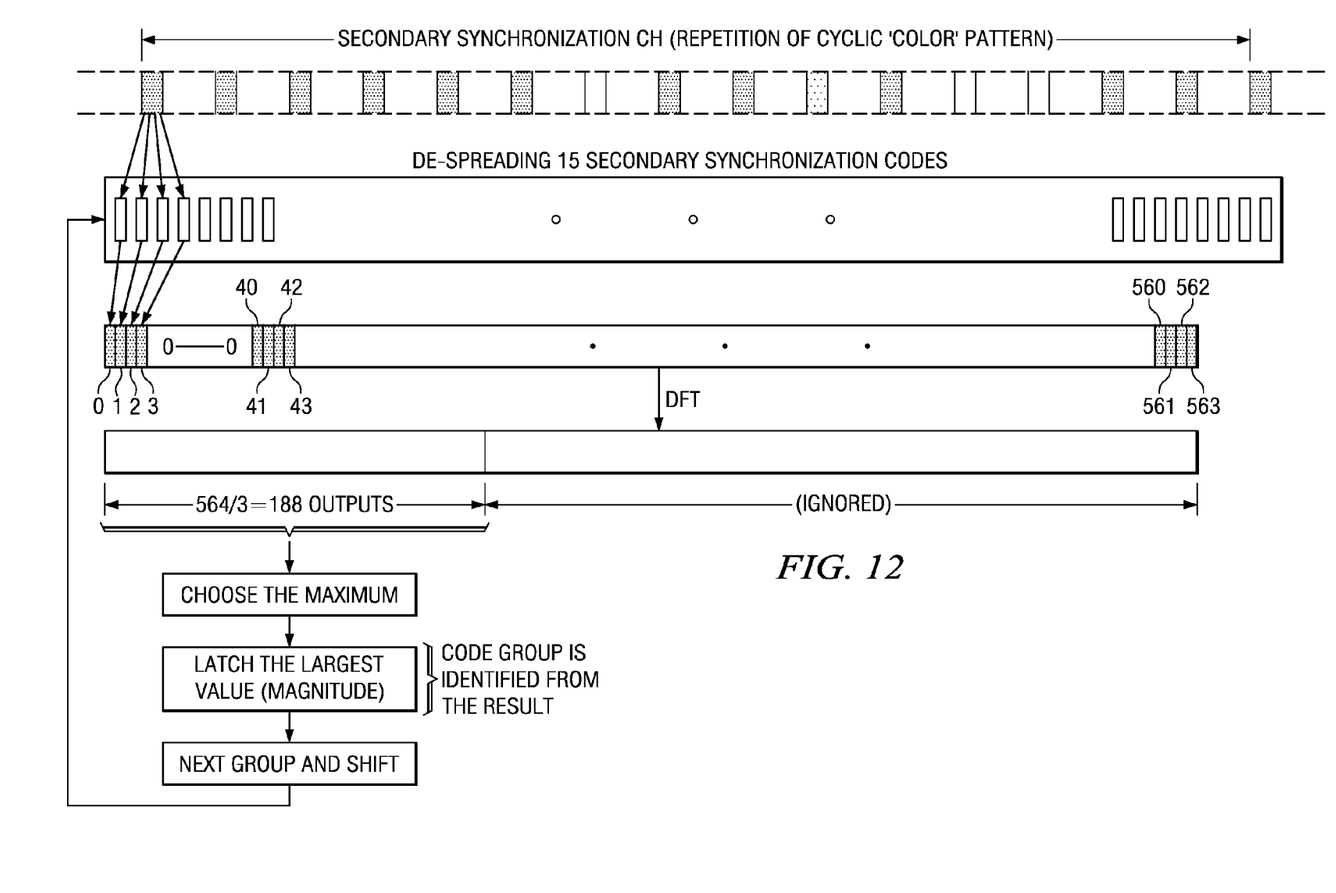
FIGS. 12, 14 show preferred embodiment implementations.

Note that E is the discrete Fourier transform (DFT) of the sequence $S_m$, so E can be evaluated simply by computing the DFT of the sequence for the frequency $\phi$. Hence, the preferred embodiment methods compute the DFT, look for the frequency yielding the maximum magnitude, and use this maximum as the value of $|E(grp, shft, \Lambda)|$. Then the preferred embodiment methods find the grp,shft that maximize $|E(grp, shft, \Lambda)|$ to identify the scrambling code group and frame synchronization. FIG. 1b is a flow diagram, and FIG. 12 illustrates a preferred embodiment apparatus for finding the maximum |E| over the set of scrambling code groups and shifts.

The DFT frequency $\phi$ spans 0 to $2\pi$ which equals 0 to 563 in terms of the discrete frequency variable using 4 sub-symbols per symbol in a frame of 15 slots. The use of 64-chip sub-symbols implies the DFT frequency range corresponds to 0 to 3.84 MHz/64=60 KHz, and this covers frequency errors of 0 to 30 ppm. Thus limiting the frequency error range to less than 10 ppm implies that only ⅓ of the DFT frequency range need be checked for maximum magnitude. FIG. 12 illustrates this restriction to discrete frequencies in the range 0 to 187 by ignoring the remaining potential outputs.

Figure 13:
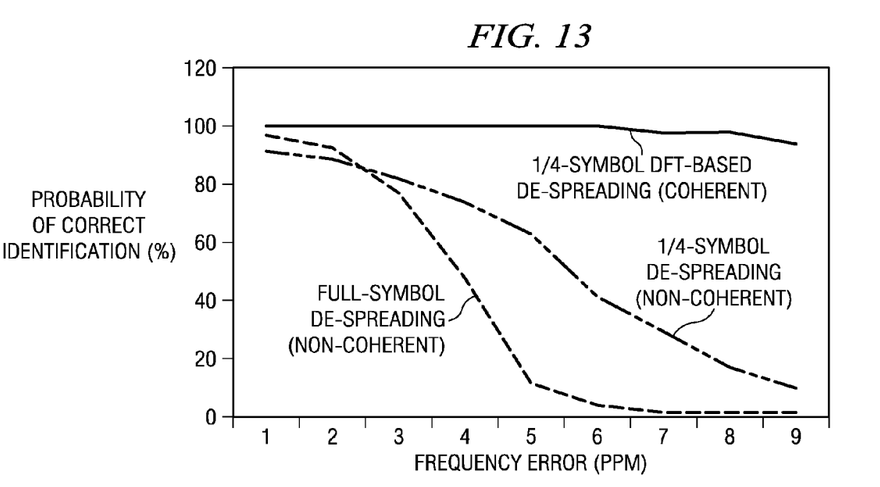

FIG. 13 shows the performance using the preferred embodiment method (DFT maximum magnitude from ¼ symbol coherent despreading) for the second step of the cell search under the condition $E_b/N_0$=1 (0 dB). The method achieves over 94% correct scrambling code group identification over a frequency error range of 0 to 9 ppm.

Figure 14:
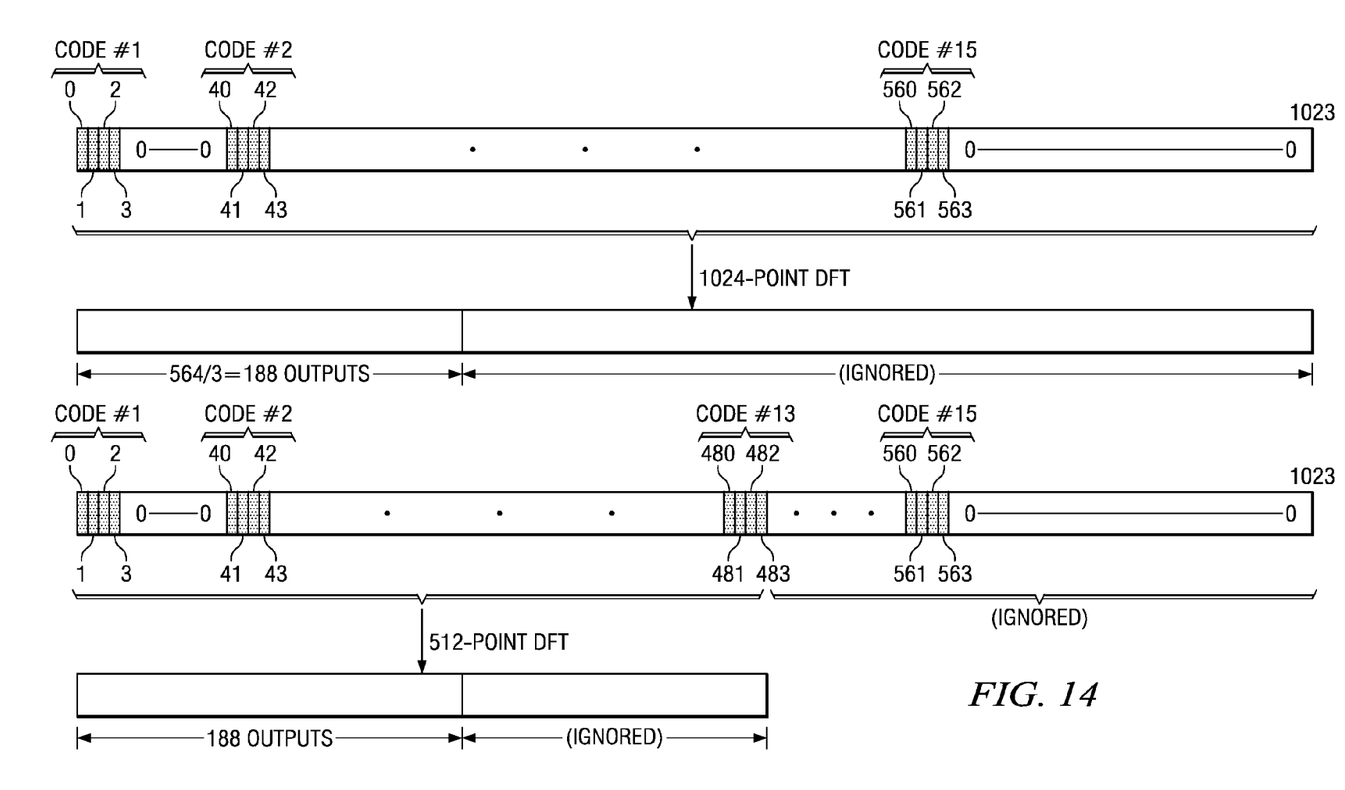

Furthermore, FIG. 14 upper portion shows use of the fast Fourier transform (FFT) for the DFT computation by padding the sequence $S_m$ with 0s to have 1024 samples. As previously noted, only frequencies in the range 0 to 187 need by checked for maximum magnitude to cover frequency errors of up to 10 ppm.

Figure 15:
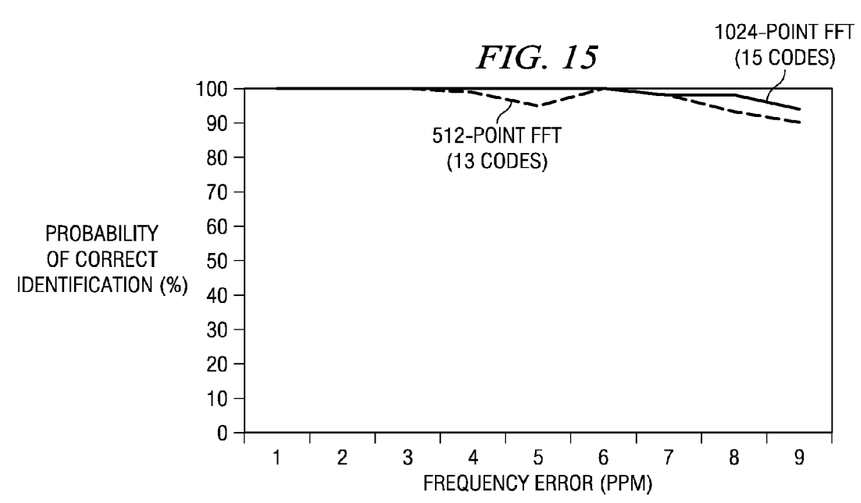

Conversely, FIG. 14 lower portion shows a simplification by deletion of the last two symbols (so only 13 slots used) and a 512-point FFT. Again, only frequencies in the range 0 to 187 need by checked for maximum magnitude. And FIG. 15 shows only small performance degradation by this deletion.

In all of the foregoing DFT methods only about 10% of the $S_m$s are non-zero (only the first 256 chips per slot), this allows further simplification of the DFT (FFT).

The 16 SSCs are derived from row vectors of the 256×256 Hadamard matrix H8. And the 960 length-15 code sequences searched (64 different length-15 sequences of SSCs and 15 shift positions for each sequence) have at most 2 SSC matches, so at most 2 out of the 15 symbols would be despread properly with the wrong code sequence. However, when the 256-chip SSCs are partitioned into 64-chip portions, the SSCs in groups 4 have common 64-chip portions, and up to 7 or 8 of the 15 symbols will have their 4 sub-symbols properly despread with the wrong code; that is, up to 28 or 32 of the 60 non-zero $S_m$s despread with the wrong code sequence may have large magnitudes. In constrast, all 60 non-zero $S_m$s would have large magnitude when despread with the proper code sequence.

4. TDD Mode

The features of the preferred embodiments for FDD mode can be adapted to TDD mode cell search, both first and second steps. In particular, for TDD mode the physical synchronization channel (PSCH) has a 256-chip duration and contains the PSC and a code set of three SSCs. Each of these codes can again be partitioned into four 64-chip portions, and despreading with these 64-chip portions again yields sub-symbols with phase rotation. The phase rotation between successive slots is greater in TDD than in FDD because the PSCH only occurs in one or two slots per frame, as opposed to the SCH in every slot of a frame in FDD. Further, each PSCH-containing slot will yield 12 despread sub-symbols (4 for each of the 3 SSCs of the code set used).

5. Modifications

The features of partitioning a despread symbol into sub-symbols and combining coherently and non-coherently in different ways to account for phase rotation can be used with differing numbers of sub-symbols and differing coherent combinations of subsets of sub-symbols plus differing non-coherent combinations of the coherent subcombinations.

What is claimed is:

1. A method of communication cell search, comprising:
   (a) receiving a synchronization signal;
   (b) despreading said signal with a first sequence of codes to generate a sequence of sub-symbols;
   (c) computing a discrete Fourier transform of said sequence of sub-symbols from step (b);
   (d) finding a maximum magnitude of said discrete Fourier transform from step (c);
   (e) repeating steps (b)–(d) for a second sequence of codes; and
   comparing said maximum from said first sequence of codes and said maximum from said second sequence of codes to select between said first sequence of codes and said second sequence of codes for cell search.

2. The method of claim 1, wherein:
   (a) said first sequence of codes includes 15 codes, each of said 15 codes with 256 chips; and
   (b) said sub-symbols have 64 chips.

3. The method of claim 2, wherein:
   (a) said second sequence of codes is a shift of said first sequence of codes.

4. The method of claim 1, wherein:
   (a) said first and second sequences are associated with first and second scrambling codes of a communications cell.

5. The method of claim 1, further comprising:
   (a) repeating steps (b)–(d) of claim 1 of despreading said signal with a first sequence of codes to generate a sequence of sub-symbols, computing a discrete Fourier transform of said sequence of sub-symbols, and finding a maximum magnitude of said discrete Fourier transform for a total of 960 sequences of codes which consists of 64 sequences of codes and 15 shifts of each of said sequences of said 64 sequences;
   (b) extending step (e) of claim 1 of repeating steps (b)–(d) for a second sequence of codes, and comparing said maximum from said first sequence of codes and said maximum from said second sequence of codes to select between said first sequence of codes and said second sequence of codes for cell search for said 960 sequences of codes to select the code with the maximum discrete Fourier transform magnitude; and
   (c) identifying frame synchronization and scrambling codes from said code selected in step (b).

6. The method of claim 1, wherein:
   (a) said despreading of step (b) of claim 1 of despreading said signal with a first sequence of codes to generate a sequence of sub-symbols uses less than all of the codes of said first sequence of codes.

7. The method of claim 1, wherein:
   (a) said computing a discrete Fourier transform of step (c) of claim 1 of computing a discrete Fourier transform of said sequence of sub-symbols is by a fast Fourier transform.

8. A method of communication cell search, comprising:
   (a) receiving a synchronization signal;
   (b) despreading said signal with a first sequence of codes to generate a sequence of sub-symbols;
   (c) partitioning said sequence of sub-symbols from step (b) into a first set of sub-symbols and a second set of sub-symbols, computing a first coherent combination of said first set of sub-symbols and a second coherent combination of said second set of sub-symbols, and non-coherently combining said first coherent combination and said second coherent combination;
   (d) partitioning said sequence of sub-symbols from step (b) into a third set of sub-symbols and a fourth set of sub-symbols, computing a third coherent combination of said third set of sub-symbols and a fourth coherent combination of said fourth set of sub-symbols, and non-coherently combining said third coherent combination and said fourth coherent combination;
   (e) finding a maximum magnitude of said non-coherent combinations from steps (c) and (d):
   (f) repeating steps (b)–(e) for a second sequence of codes; and
   (g) comparing said maximum of step (e) from said first sequence of codes and said maximum of step (e) from said second sequence of codes to select between said first sequence of codes and said second sequence of codes for cell search.

9. The method of claim 8, wherein:
   (a) said sequence of sub-symbols despread with said first sequence of codes is $S_1^{(1)}, S_1^{(2)}, S_1^{(3)}, S_1^{(4)}$; and
   (b) said first set of sub-symbols is $S_1^{(1)}, S_1^{(2)}$, said second set of sub-symbols is $S_1^{(3)}, S_1^{(4)}$, said third set of sub-symbols is $S_1^{(1)}, S_1^{(4)}$, and said fourth set of sub-symbols is $S_1^{(2)}, S_1^{(3)}$.

10. The method of claim 8, further comprising:
    (a) partitioning said sequence of sub-symbols from step (b) of claim 8 of despreading said signal with a first sequence of codes to generate a sequence of sub-symbols into a fifth set of sub-symbols and a sixth set of sub-symbols, computing a third coherent difference of said fifth set of sub-symbols and a sixth coherent combination of said sixth set of sub-symbols, and non-coherently combining said fifth coherent combination and said sixth coherent combination; and
    (b) including said non-coherently combination of said fifth coherent combination and said sixth coherent combination in said finding maximum of step (e) of claim 8 of finding a maximum magnitude of said non-coherent combinations.

* * * * *